(12) United States Patent
De Groot

(10) Patent No.: US 6,175,225 B1
(45) Date of Patent: Jan. 16, 2001

(54) SWITCHING ARRANGEMENT AND SWITCH COMPONENT FOR A DC-DC CONVERTER

(75) Inventor: Leonardus A. De Groot, Stockport (GB)

(73) Assignee: U.S. Philips Corporation, New York, NY (US)

(*) Notice: Under 35 U.S.C. 154(b), the term of this patent shall be extended for 0 days.

(21) Appl. No.: 09/606,340

(22) Filed: Jun. 29, 2000

(30) Foreign Application Priority Data

Jul. 2, 1999 (GB) .................................. 9915461
Aug. 4, 1999 (GB) .................................. 9918249

(51) Int. Cl.$^7$ ........................................ G05F 1/56
(52) U.S. Cl. ................................. 323/282; 323/284
(58) Field of Search .............................. 323/282, 283, 323/284, 351, 222

(56) References Cited

U.S. PATENT DOCUMENTS

| | | | |
|---|---|---|---|
| 5,097,196 | * 3/1992 | Schoneman | 323/222 |
| 5,233,287 | * 8/1993 | Lenk | 323/268 |
| 5,479,089 | 12/1995 | Lee | 323/283 |
| 5,777,461 | * 7/1998 | Massie et al. | 323/282 |
| 5,808,455 | * 9/1998 | Schwartz et al. | 323/271 |
| 5,929,692 | * 7/1999 | Carsten | 327/531 |
| 5,994,885 | * 11/1999 | Wilcox et al. | 323/285 |
| 6,031,361 | * 2/2000 | Burstein et al. | 323/224 |
| 6,100,676 | * 8/2000 | Burstein et al. | 323/283 |

* cited by examiner

Primary Examiner—Adolf Deneke Berhane
(74) Attorney, Agent, or Firm—Steven R. Biren

(57) ABSTRACT

A dc—dc converter comprises first (5) and second (6) transistor switches connected in series between a dc input (1) and ground (4). The converter includes an inductor connecting the junction (8) of the two switches to a dc output and also a capacitor connecting the dc output to ground. The switches are closed alternately in response to a switching signal applied to a switching signal input (3), thereby alternately charging the capacitor from the dc input through the first switch and the inductor and discharging the energy stored in the inductor into the capacitor via the second switch. The coupling (12) from the switching signal input to the control input (25) of the second switch is provided with a threshold-responsive disable signal input (13) which is connected to the junction (8) between the two switches, for preventing the second switch from being controlled to a closed state at any time that the voltage on the junction is above a predetermined threshold. This threshold is set to be substantially zero by means of a comparator (28). Thus the second switch is prevented from being closed both when the first switch is conducting and also should the capacitor attempt to discharge through it. The latter would otherwise occur should the converter enter sleep mode, when the switching signal would be absent.

17 Claims, 4 Drawing Sheets

SWITCHING ARRANGEMENT AND SWITCH COMPONENT FOR A DC-DC CONVERTER

BACKGROUND OF THE INVENTION

This invention relates to a switching arrangement for a dc—dc converter and to a dc—dc converter including such a switching arrangement. The invention also relates to a switch component for use in such an arrangement or converter, the component being a switch device or a coupling and switch device.

U.S. Pat. No. 5,479,089 discloses a dc—dc converter having the general form shown in FIG. 1 of the accompanying diagrammatic drawings. A switching arrangement 46 has a switching signal input 3, a switch output 45, and a dc input 1 for receiving a dc input voltage of a given polarity relative to a common point 4. A switching signal source 18 which produces pulse-width-modulated switching pulses (a PWM controller) has its output connected to the switching signal input 3. The switch output 45 is connected to one end of an inductor 7 the other end of which is connected to a dc output 2. A capacitor 9 is connected between the dc output 2 and the common point 4.

In operation the arrangement 46 connects its switch output 45, and hence the one end of the inductor 7, alternately to the dc input 1 and to the common point 4 in response to the switching pulses applied to the switching signal input 3, thereby alternately causing the capacitor 9 to be charged from dc input 1 through inductor 7 and allowing energy stored in inductor 7 to be transferred to capacitor 9. The dc output 2 is coupled to a modulation signal input 19 of the PWM controller 18 to provide feedback to regulate the voltage at output 2. The converter therefore operates as a buck regulator.

As shown in FIG. 2 of the accompanying diagrammatic drawings, the switching arrangement 46 of the known converter includes first and second controllable semiconductor switches 5 and 6 respectively which are connected in series between the dc input 1 and the common point 4, with the first switch 5 connected to the dc input 1 and the second switch 6 connected to the common point 4. The connection 8 between the switches 5 and 6 is connected to the switch output 45. A first coupling 10 couples the switching signal input 3 to a control input 11 of the first switch 5, and a second coupling 12 couples the switching signal input 3 to a control input 25 of the second switch 6. The second coupling 12 has a threshold-responsive disable signal input 13 for disabling control of the switch 6 to its closed state when the voltage on this input has the given polarity (the polarity of the voltage at dc input 1) relative to a predetermined threshold value. The connection 8 between the switches 5 and 6 is connected to the disable signal input 13 via a clamp circuit comprising a resistor 14, a diode 15 connected in parallel with this resistor, and a Zener diode 16. The clamp circuit 14, 15, 16 is included to limit any positive voltage occurring at input 13 to a predetermined maximum value (assuming a positive supply voltage on dc input 1 relative to the common point 4). The first coupling also has a threshold-responsive disable signal input 17 for disabling control of the switch 5 to its closed state when the voltage on this input has the given polarity relative to a predetermined threshold value. Disable signal input 17 is connected to the control electrode 25 of switch 6.

The first coupling 10 comprises a two-input NOR gate 20, a two-input NOR gate 21, and a driver circuit 22, connected in cascade. The second input of NOR gate 20 is connected to ground and the second input of NOR gate 21 is connected to the disable signal input 17. NOR gate 20 operates as an inverter, as does NOR gate 21 when its second input, i.e. the voltage at disable signal input 17, is logic "0". (The logic "1" level has the aforesaid given polarity relative to the logic "0" level.) Thus, when the voltage at disable signal input 17 is logic "0", the application of a logic "1" level to switching signal input 3 by source 18 results in a logic "1" level at the output of NOR gate 21, and the application of a logic "0" level to switching signal input 3 by source 18 results in a logic "0" level at the output of NOR gate 21. On the other hand, when the voltage at disable signal input 17 is logic "1", NOR gate 21 produces a logic "0" level at its output, whatever the logic level is at switching signal input 3. Logic "1" and logic "0" levels at the output of NOR gate 21 cause driver circuit 22 to control switch 5 to its closed and opened states respectively.

The second coupling 12 comprises a two-input NOR gate 23 and a driver circuit 24, connected in cascade. The second input of NOR gate 23 is connected to the disable signal input 13. NOR gate 23 operates in a similar way to NOR gate 21, i.e. it operates as an inverter when its second input, i.e. the voltage at disable signal input 13, is logic "0". Thus, when the voltage at disable signal input 13 is logic "0", the application of logic "0" and "1" levels to switching signal input 3 by source 18 result in logic "1" and "0" levels respectively at the output of NOR gate 23. On the other hand, when the voltage at disable signal input 13 is logic "1", NOR gate 23 produces a logic "0" level at its output, whatever the logic level is at switching signal input 3. Similarly to driver circuit 22, logic "1" and logic "0" levels at the output of NOR gate 23 cause driver circuit 24 to control switch 6 to its closed and opened states respectively.

Assuming initially that the voltages at the disable signal inputs 13 and 17 are both logic "0", the operation of the circuit of FIG. 2 is conventional; the application of a switching signal consisting of alternating logic "0" and logic "1" levels to switching signal input 3 causes the driver circuits 22 and 24 to control the switches 5 and 6 to their open and closed states in an alternating manner and in antiphase. When switch 5 is closed and switch 6 is open capacitor 9 is charged from dc input 1 through inductor 7, energy also being stored in inductor 7 during this time. When switch 5 then opens and switch 6 then closes, the energy stored in the inductor continues to charge the capacitor 9.

The reason for the provision of the disable signal inputs 13 and 17 connected in the manner shown is that, in practice, the circuit is liable to operate in a less than ideal manner. More particularly there is liable to be some delay in the opening of the switches 5 and 6 in response to the relevant transitions in the switching signal applied to input 3, resulting in overlap of the periods during which the switches 5 and 6 (which may be constituted by field-effect transistors, FETs) are closed. It will be appreciated that such overlap can have disastrous consequences, as it will give rise to so-called "shoot-through currents" between the dc input 1 and the common point 4. The connection of the disable signal input 17 to the control input 25 of switch 6 ensures that gate 21 cannot produce a logic "1" in response to each transition of the switching signal at input 3 from logic "0" to logic "1", to thereby cause the switch 5 to close, until the voltage on the control input 25 of switch 6 has fallen below the logic "1" to logic "0" threshold level exhibited by the inputs of gate 21. (This situation corresponds to switch 6 being fully open.) Similarly, the connection of the disable signal input 13 to the connection 8 between switches 5 and 6 ensures that gate 23 cannot produce a logic "1" in response to each transition of the switching signal at input 3 from logic "1" to logic "0", to thereby cause the switch 6 to close, until the voltage on the connection 8 has fallen below the logic "1" to logic "0" threshold level exhibited by the inputs of gate 23. (This situation corresponds to switch 5 being fully open.) The converter therefore operates as an asynchronous-timed synchronous dc—dc converter.

In order to conserve energy modern PWM controllers may be arranged to go into 'sleep-mode' under low load conditions, this being especially true for multi-phase controllers where one or more phases may shut off. "Sleep mode" in the context of the arrangement of FIG. 1 means that the source 18 will supply a logic "0" level to switching signal input 3 continuously. This will result in switch 5 being continuously open, isolating dc input 1 from dc output 2 as is required in such a situation. Switch 6 will initially close in the normal way when switch 5 opens, allowing the energy stored in inductor 7 to be transferred to capacitor 9. If it is assumed for example that the dc input voltage applied to input 1 is positive relative to common point 4, the voltage at connection 8 will be negative relative to common point 4, and decreasing in magnitude towards zero, when this happens due to the finite closed resistance of switch 6, so that the voltage at the disable signal input will also be negative but decreasing in magnitude towards zero, allowing switch 6 to be maintained in a closed state. When the energy in inductor 7 has been fully transferred, the voltage at connection 8 becomes zero and capacitor 9 starts to discharge through the inductor 7 and the closed switch 6. The current through the switch 6 changes sign when this happens, and starts to increase in the opposite direction, causing the voltage at the connection 8 to become increasingly positive. However, this increasing positive voltage will not normally exceed the logic "0" to logic "1" threshold level exhibited by the inputs of gate 23, or at least will not do so until the discharge current becomes quite large, so that the output of gate 23 remains at logic "1", the switch 6 remains closed, and the capacitor 9 continues to discharge through the closed switch 6, draining the energy stored in this capacitor.

Similar discharge of the capacitor 9 through the switch 6 occurs if the converter operates in discontinuous mode, i.e. if the mark-to-space ratio of the logic "1" switching pulses applied to the input 3 is sufficiently small and/or the inductance of the inductor 7 is sufficiently small that the energy stored in the inductor 7 becomes completely transferred to the capacitor 9 before each closure of switch 5. Each time the energy in the inductor becomes completely transferred the capacitor 9 starts to discharge through switch 6, and this discharge continues until the switch 5 closes once again or the discharge current becomes so large that the voltage on connection 8 exceeds the logic "0" to logic "1" threshold level exhibited by the inputs of gate 23. This obviously reduces the efficiency of the converter.

SUMMARY OF THE INVENTION

It is an object of the invention to mitigate these disadvantages.

According to one aspect the invention provides a switching arrangement for a dc—dc converter, for connecting one end of an inductor, which is included in the converter and the other end of which is connected to a dc output, alternately to a dc input for receiving a dc input voltage of a given polarity and to a common point, said arrangement having a switching signal input and a switch output for connection to the one end of the inductor, said arrangement comprising first and second controllable semiconductor switches connected in series between the dc input and the common point with the first switch connected to the dc input and the second switch connected to the common point, and first and second couplings from a switching signal input to control inputs of the first and second switches respectively for controlling the switches to operate in antiphase in response to the application of a switching signal to the switching signal input, the second coupling being provided with a threshold-responsive disable signal input for disabling control of the second switch to its closed state when the voltage on the disable signal input has said given polarity relative to a predetermined threshold value, the connection between the first and second switches being connected to the switch output and the disable signal input, characterized in that said predetermined threshold value is substantially equal to the voltage at said common point.

According to another aspect the invention provides a dc—dc converter including such a switching circuit arrangement, the converter also including the inductor connected between the switch output and the dc output, a capacitor connected between the dc output and the common point, and a switching signal source having its output connected to the switching signal input.

According to yet another aspect the invention provides a coupling and switch device for use in such a switching arrangement or converter, said device having a switching signal input terminal, a control signal output terminal for connection to the control input of the first switch, a further output terminal for connection to the main current path of the first switch and to said switch output, a sense signal input terminal for connection to the further output terminal, a voltage supply terminal, and a common terminal, said device comprising a controllable semiconductor switch for use as said second semiconductor switch, which controllable semiconductor switch is connected between the further output terminal and the common terminal, and first and second couplings from the switching signal input to the control signal output terminal and to a control input of said controllable semiconductor switch respectively for producing switch control signals at their respective outputs in response to the application of a switching signal to the switching signal input, the second coupling being provided with a threshold-responsive disable signal input for disabling control of said controllable semiconductor switch to its closed state when the voltage on the disable signal input has the given polarity relative to a predetermined threshold value which is substantially equal to the voltage at said common terminal, the sense signal input terminal being connected to the disable signal input.

According to yet another aspect the invention provides a coupling and switch device for use in such a switching arrangement or converter, said device having a switching signal input terminal, a control signal output terminal for connection to the control input of the second switch, a further output terminal for connection to the main current path of the second switch and to said switch output, a sense signal input terminal for connection to the further output terminal, a voltage supply terminal, a further supply terminal for connection to the dc input, and a common terminal, said device comprising a controllable semiconductor switch for use as said first semiconductor switch, which controllable semiconductor switch is connected between the further supply terminal and the further output terminal, and first and second couplings from the switching signal input to a control input of said controllable semiconductor switch and to the control signal output terminal respectively for producing switch control signals at their respective outputs in response to the application of a switching signal to the switching signal input, the second coupling being provided with a threshold-responsive disable signal input for disabling, when the voltage on the disable signal input has the given polarity relative to a predetermined threshold value, production at said control signal output terminal of a control signal which would otherwise be produced thereat in response to a signal at the switching signal input which is such as to control said semiconductor switch to its open state, the predetermined threshold value being substantially equal to the voltage at said common terminal and the sense signal input terminal being connected to the disable signal input.

According to a further aspect the invention provides a switch device for use in such a switching arrangement or converter, said device having a switching signal input and comprising an n-channel field effect transistor, a coupling from the switching signal input to the gate electrode of said transistor for controlling said transistor alternately to its conductive and non-conductive states in response to the application of a switching signal to said switching signal input, and a voltage comparator having a first input for connection to the drain electrode of said transistor, a second input connected to the source electrode of said transistor, and an output coupled to the gate electrode of said transistor for disabling control of said transistor to its conductive state in the presence of any positive voltage at the drain electrode of said transistor relative to the source electrode of said transistor.

Making the predetermined threshold value to which the disable signal input of the second coupling responds substantially equal to the voltage at the common point can substantially prevent discharge of the capacitor through the second switch.

BRIEF DESCRIPTION OF THE DRAWING

Embodiments of the invention will now be described, by way of example, with reference to the accompanying diagrammatic drawings in which.

DESCRIPTION OF THE PREFERRED EMBODIMENTS

Figure 1:
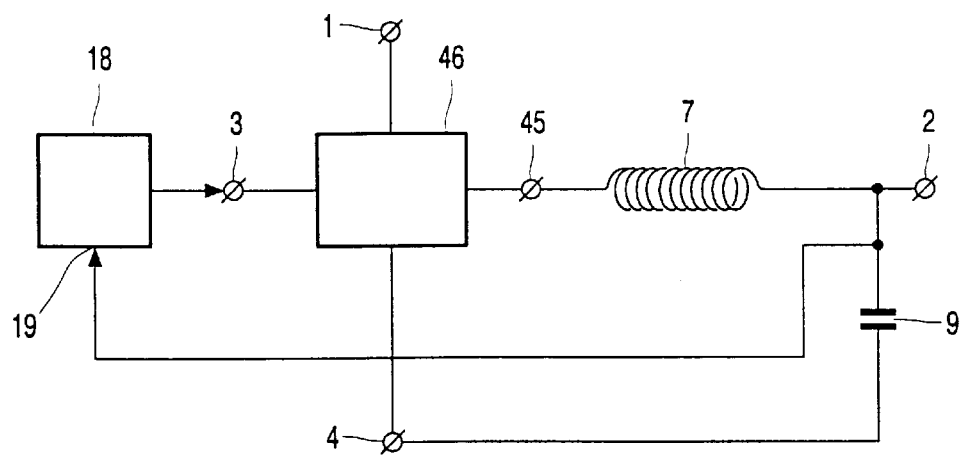
FIG. 1 shows the general form of a dc—dc converter as already described.
Figure 2:
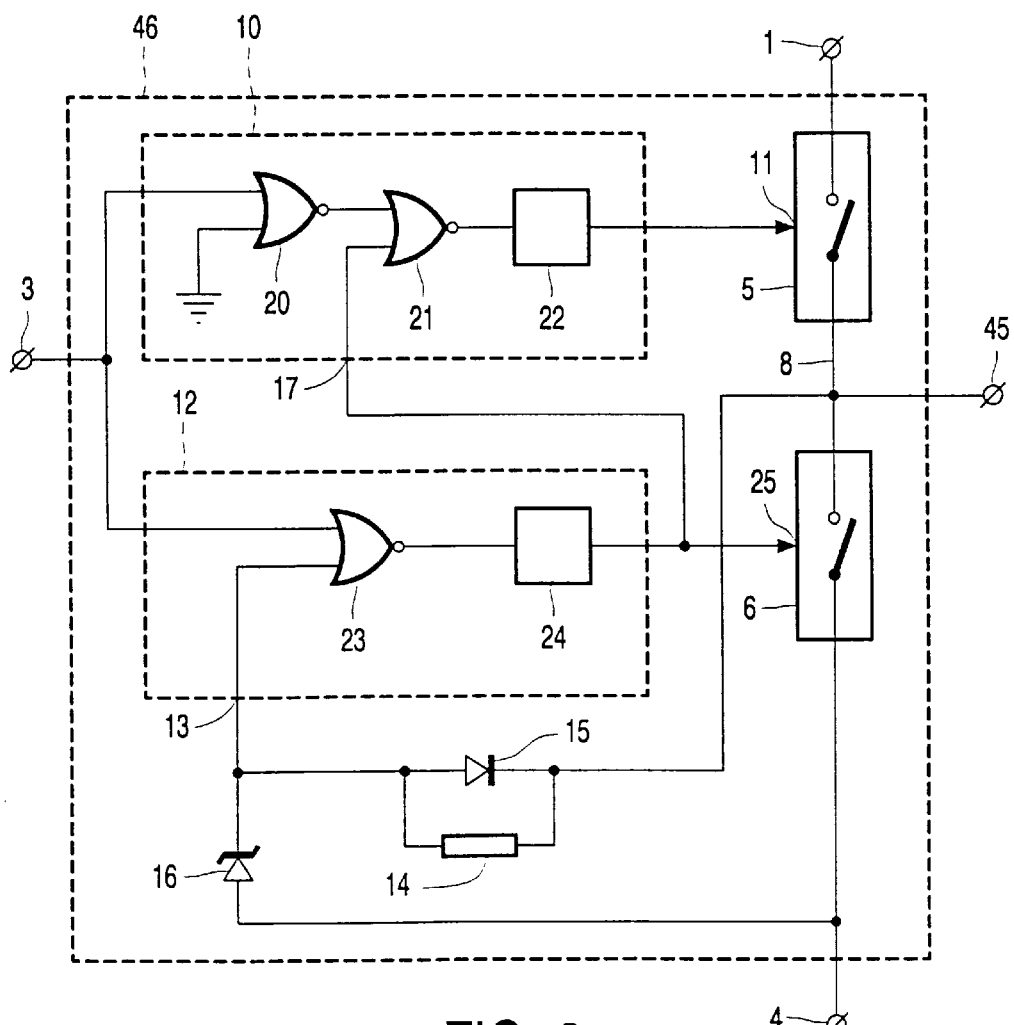
FIG. 2 shows a prior art construction for a switching arrangement included in the converter of FIG. 1, as already described.
Figure 3:
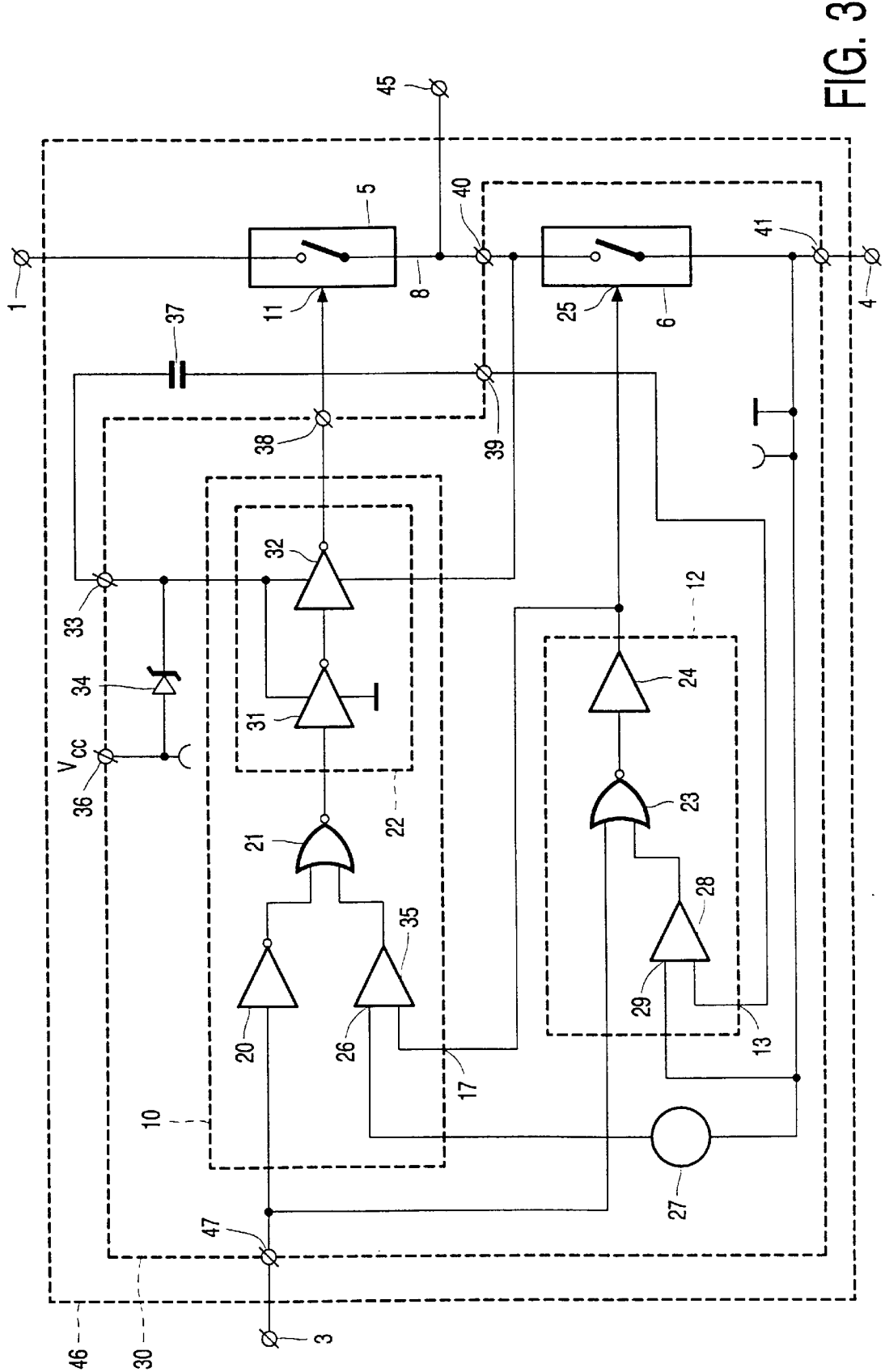
FIG. 3 shows an example in accordance with the invention of a construction for the switching arrangement included in the converter of FIG. 1.

The construction for the switching arrangement 46 of FIG. 1 shown in FIG. 3 has many components which have counterparts in the prior art construction of FIG. 2 and, where this is the case, the counterpart components have been given the same reference numerals.

The switching arrangement 46 of FIG. 3 again includes first and second controllable semiconductor switches 5 and 6 respectively which are connected in series between the dc input 1 and the common point 4, with the first switch 5 connected to the dc input 1 and the second switch 6 connected to the common point 4. The connection 8 between the switches 5 and 6 is again connected to the switch output 45. A first coupling 10 again couples the switching signal input 3 to a control input 11 of the first switch 5, and a second coupling 12 again couples the switching signal input 3 to a control input 25 of the second switch 6. The second coupling 12 again has a threshold-responsive disable signal input 13 for disabling control of the switch 6 to its closed state when the voltage on this input has the given polarity relative to a predetermined threshold value. The connection 8 between the switches 5 and 6 is again connected to the disable signal input 13; this connection to input 13 may include a clamp circuit (not shown) similar to the clamp circuit 14, 15, 16 of FIG. 2, if desired. The first coupling 10 again has a threshold-responsive disable signal input 17 for disabling control of the switch 5 to its closed state when the voltage on this input has the given polarity (the polarity of the voltage at dc input 1) relative to a predetermined threshold value. Disable signal input 17 is again connected to the control electrode 25 of switch 6.

The first coupling 10 again comprises an inverter 20, a two-input NOR gate 21, and a driver circuit 22, connected in cascade. However, in FIG. 3 the disable signal input 17 is connected to the second input of NOR gate 21 via a voltage comparator 35 rather than directly. The reference voltage input 26 of comparator 35 is connected to a reference voltage source 27. Which of the two inputs of comparator 35 is connected to source 27 and which is connected to disable signal input 17 are chosen in such manner that comparator 35 produces a logic "1" at its output, thereby disabling control of switch 5 to its closed state, when the voltage at disable signal input 17 has the same polarity relative to the output voltage of source 27 as the dc voltage applied to input 1, and produces a logic "0" at its output otherwise.

The driver circuit 22 in the first coupling 10 of FIG. 3 moreover comprises a first inverting amplifier 31 and a second inverting amplifier 32 connected in cascade. Power is supplied to amplifier 31 from a point 33 relative to the common point 4, and power is supplied to amplifier 32 from the point 33 relative to the connection 8 between the switches 5 and 6. Point 33 is connected via a diode 34, preferably a Schottky diode as shown, to an input 36 for a supply voltage Vcc (relative to the common point 4) for the circuit elements 20, 21, 23, 24, 28 and 35, and also via a reservoir capacitor 37 to the connection 8 between the switches 5 and 6. Power for the amplifier 32 is therefore derived from across the reservoir capacitor 37, which is charged from Vcc via the diode 34 when the voltage at connection 8 is low. Because the supply voltage to amplifier 32 is relative to the connection 8, and is maintained substantially constant by the reservoir capacitor 37 at least in the short term, the drive which amplifier 32 supplies to the control input 11 of switch 5 relative to the connection 8 is substantially independent of the instantaneous voltage on this connection. Amplifier 31, which may be constituted by an open-collector transistor amplifier, serves to shift the logic levels at the output of NOR gate 21 (which are relative to the common point 4) to logic levels which are relative to point 33 and hence to connection 8, thereby making them suitable for application to the amplifier 32.

The coupling 10 of FIG. 3 operates in a similar way to the coupling 10 of FIG. 2, the main difference being that the presence of voltage comparator 35 permits greater control over the threshold voltage which is required at input 17 to cause the control of switch 5 to its closed state to be disabled. If the switch 6 is constituted by a field effect transistor this threshold voltage (the output voltage of reference source 27) is set to a value which is lower than the threshold voltage of this transistor.

The second coupling 12 of FIG. 3 again comprises a two-input NOR gate 23 and a driver circuit 24, connected in cascade. However, in FIG. 3 the disable signal input 13 is connected to the second input of NOR gate 23 via a voltage comparator 28 rather than directly. The reference voltage input 29 of comparator 28 is connected to the common point 4. Which of the two inputs of comparator 28 is connected to common point 4 and which is connected to disable signal input 13 are chosen in such manner that comparator 28 produces a logic "1" at its output, thereby disabling control of switch 6 to its closed state, when the voltage at disable signal input 13 has the same polarity relative to the voltage on the common point 4 as the dc voltage applied to input 1, and produces a logic "0" at its output otherwise.

The second coupling 12 of FIG. 3 operates in a substantially identical way to the coupling 12 of FIG. 2, the difference being that the presence of comparator 28 results in the threshold voltage which is required at input 13 to cause the control of switch 6 to its closed state to be disabled being set to substantially zero. It will be appreciated that this difference results in draining of capacitor 9 through the switch 6 being at least substantially prevented, both if the converter enters sleep mode and if the converter operates in discontinuous mode. Any attempt by capacitor 9 to discharge through switch 6 results in the threshold voltage at input 13 being exceeded, and thus the opening of switch 6.

Figure 4:
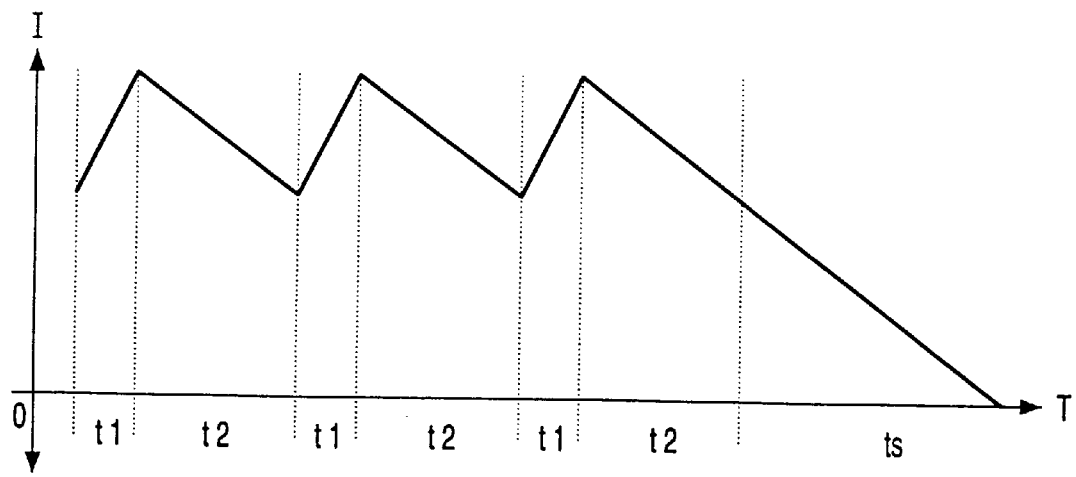
FIG. 4 shows in an idealized manner the current through an inductor included in the converter of FIGS. 1 and 3 as a function of time when the converter enters a sleep mode period from a continuous mode of operation.
Figure 5:
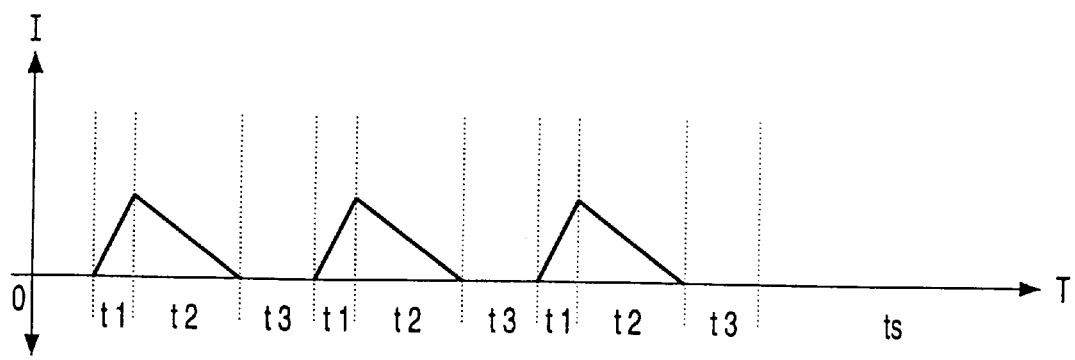
FIG. 5 shows in an idealized manner the current through the inductor included in the converter of FIGS. 1 and 3 as a function of time when the converter enters a sleep mode period from a discontinuous mode of operation.

This feature is illustrated in an idealized manner in FIGS. 4 and 5 of the drawings, both of which show the current I through the inductor 7 of FIG. 1 as a function of time T. FIG. 4 illustrates the entering of a sleep mode period ts from a continuous mode of operation and FIG. 5 illustrates the entering of a sleep mode period ts from a discontinuous mode of operation. In both of these Figures switch 5 is closed during the periods t1 and is open at all other times. During the periods t1 the capacitor 9 charges through the inductor 7 and during the immediately succeeding periods t2 switch 6 is closed and energy stored in inductor 7 is transferred to capacitor 9. When the converter is operating in continuous mode (FIG. 4) the energy transfer during each period t2 is incomplete; the current I is still positive when switch 5 closes and switch 6 opens at the start of the next period t1. However, when the continuous mode converter enters the sleep mode period ts switch 5 remains open and switch 6 initially remains closed, allowing the energy transfer which started during the immediately preceding period t2 to be completed. When the transfer is complete the current I reaches zero and attempts to change sign, causing switch 6 to open and thereby prevent any subsequent discharge of capacitor 9 through inductor 7. On the other hand, when the converter is operating in discontinuous mode (FIG. 5) the energy transfer from inductor 7 to capacitor 9 is completed (the current I falls to zero) during each period t2 and a period t3 remains before switch 5 closes at the start of the next period t1. When the current I attempts to change sign at the end of each period t2 this causes switch 6 to open and thereby prevent any discharge of capacitor 9 through inductor 7 during the subsequent period t3. This situation is maintained should the discontinuous mode converter then enter a sleep mode period ts.

Although choosing the threshold voltage at input 13 to be exactly zero is ideal, as this corresponds to a zero crossing of the current through the switch 6, some deviation from this choice may be allowable in practice. Moreover, some hysteresis may be present in the operation of comparator 28. If the threshold voltage is arranged to be slightly less than zero, e.g. by including an appropriate reference voltage source in the connection from the input 29 of comparator 28 to the common point 4, complete transfer of the energy stored in the inductor 7 to the capacitor 9 will be prevented, at least when the converter operates in discontinuous mode or enters sleep mode. On the other hand, if the threshold voltage is arranged to be slightly greater than zero, some discharge of capacitor 9 will occur, at least when the converter operates in discontinuous mode or enters sleep mode. Any deviation of the threshold from zero in either direction should in any case be less than (Rs*Vout)/Rtot, where Rs is the resistance of switch 6 when closed, Vout is the operating voltage at the output 2, and Rtot is the total resistance in the loop containing switch 6, inductor 7 and capacitor 9 when switch 6 is closed. Otherwise, in one case instability will occur each time switch 6 closes and, in the other case, the voltage applied to the disable signal input 13 will fail to prevent even some discharge of capacitor 9 through switch 6.

The switches 5 and 6 may be constituted by respective transistors, preferably field effect transistors, of the same conductivity type, for example n-channel field effect transistors with their sources connected to connection 8 and common point 4 respectively, their drains connected to dc input 1 and connection point 8 respectively, and their gates constituting the control electrodes 11 and 25 respectively. If switches 5 and 6 are constituted by such n-channel FETs the driver circuits 22 and 24 should both be constructed to be non-inverting. However, as an alternative switches 5 and 6 may be constituted by respective transistors of mutually opposite conductivity type. For example, switch 5 may be constituted by a p-channel FET with its source and drain connected to dc input 1 and connection 8 respectively and its gate constituting the control electrode 11, and switch 6 may be constituted by an n-channel FET with its source and drain connected to common point 4 and connection 8 respectively and its gate constituting control electrode 25. If switches 5 and 6 are such p-channel and n-channel FETs respectively the driver circuit 22 may simply be modified to be inverting or, as an alternative, the inverter 20 of FIG. 3 may be replaced by a direct connection, the comparator 35 be made inverting, and the NOR gate 21 be replaced by a NAND gate, as such transistors will operate in antiphase in response to the application of the same control signal to each.

Figure 6:
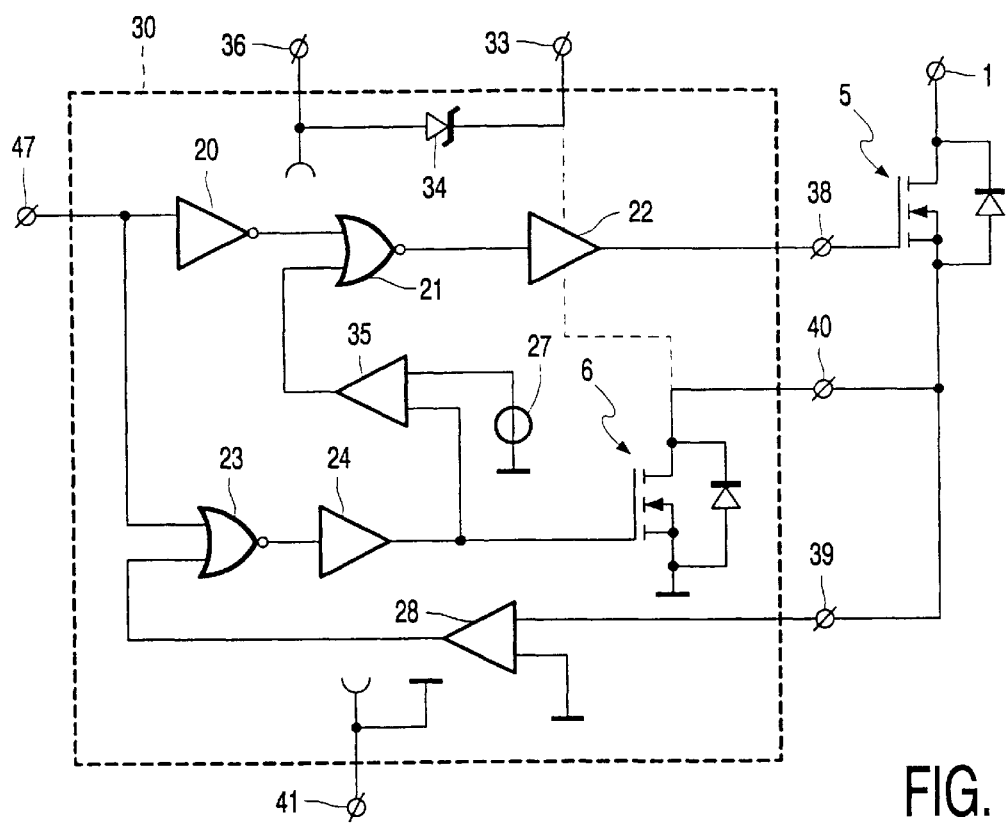
FIG. 6 shows a coupling and switch device for use in the construction of FIG. 3

The couplings 10 and 12 of FIG. 3 together with the switch 6, the voltage source 27 and the various interconnections between these components may be formed as a unitary device as indicated by the dashed line 30, this device having a boost terminal 33 for connection to the capacitor 37, a supply terminal 36 for connection to a voltage supply Vcc, a control signal output terminal 38 for connection to the control electrode of the switch 5, a sense signal input terminal 39 for connection to the connection 8 between the switches 5 and 6, a further output terminal 40 for connection to the switch 5 and to the switch output 45, a common or ground terminal 41 for connection to the common point 4, and a switching signal input terminal 47 for connection to the switching signal input 3. For clarity such a device 30 is also shown in simplified form in FIG. 6 of the drawings, together with the switch 5 and the connection between the terminals 39 and 40. In FIG. 6 the switches 5 and 6 are constituted by respective n-channel power MOSFETs. If desired the terminals 39 and 40 connected to the disable signal input 13 and to the upper electrode of switch 6 respectively may be combined as a single terminal on such a device. However, providing separate terminals 39 and 40 allows the signal on the upper electrode of switch 6 to be manipulated in a customized manner, if desired, before it is applied to the disable signal input 13.

Figure 7:
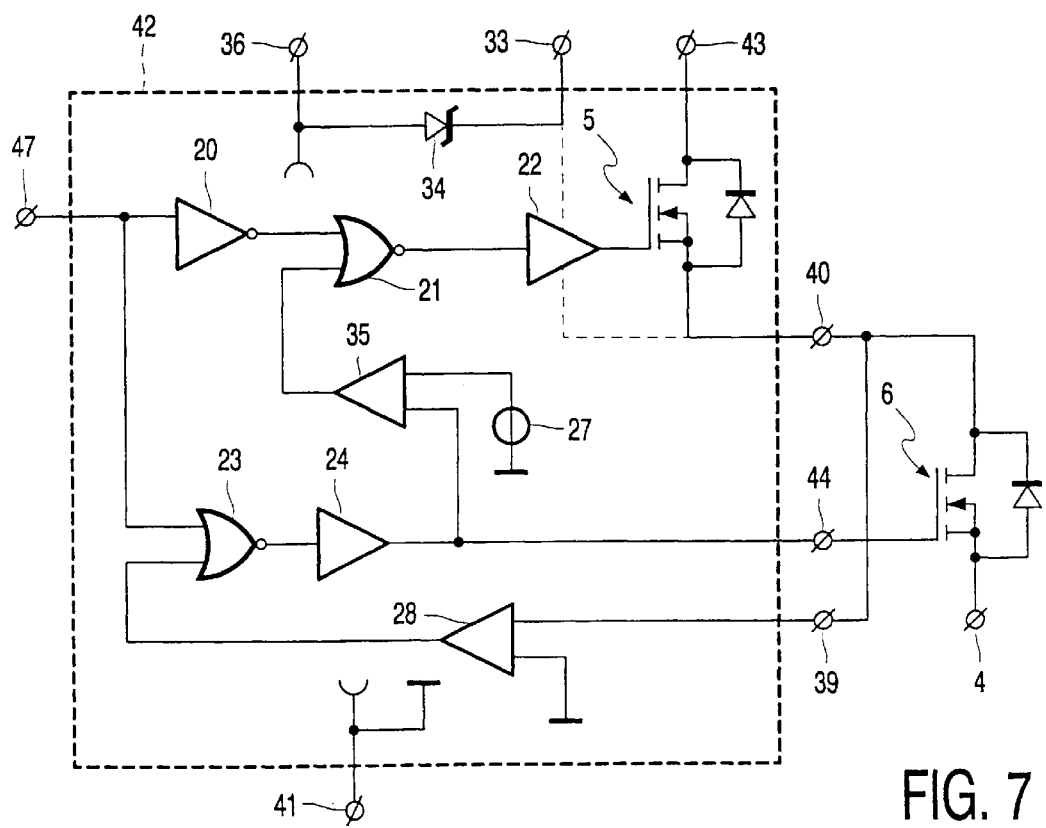
FIG. 7 shows an alternative coupling and switch device for use in the construction of FIG. 3.

As an alternative, the couplings 10 and 12 of FIG. 3 together with the switch 5, the voltage source 27 and the various interconnections between these components may be formed as a unitary device as shown in simplified form at 42 in FIG. 7 of the drawings, this device having a boost terminal 33 for connection to the capacitor 37, a supply terminal 36 for connection to a voltage supply Vcc, a sense signal input terminal 39 for connection to the connection 8 between the switches 5 and 6, a further output terminal 40 for connection to the switch 6 and to the switch output 45, a common or ground terminal 41 for connection to the common point 4, a further supply terminal 43 for connection to the dc input 1, a control signal output terminal 44 for connection to the control electrode of the switch 6, and a switching signal input terminal 47 for connection to the switching signal input 3. In FIG. 7 the switches 5 and 6 are again constituted by respective n-channel power MOSFETs. Similarly to the unit 30 of FIG. 6, the terminals 39 and 40 of the device 42 of FIG. 7 may be combined as a single terminal if desired.

As yet another alternative both of the switches 5 and 6 of FIG. 3 may be included within a unitary device which also includes the couplings 10 and 12, the voltage source 27 and the various interconnections between these components, this device having a boost terminal 33 for connection to the capacitor 37, a supply terminal 36 for connection to a voltage supply Vcc, an output terminal constituting the switch output 45, a common or ground terminal 41, a switching signal input terminal 47 for connection to the switching signal input 3, and a further supply terminal, analogous to terminal 43 of FIG. 7 and connected to the upper electrode of switch 5, for connection to the dc input 1. Such a device may take the form, for example, of a 7-pin D²PAK (SOT427) package.

Furthermore, it is possible to assemble a unitary device that also includes the capacitor 37 in a package with either one or both of the switches and 6 and the couplings 10 and 12.

The device 30 of FIG. 6, and the device 42 of FIG. 7 if its terminals 39 and 40 are combined as a single terminal, may similarly each be implemented in, for example, a two-chip component form in a common package, for example, a 7-pin D²PAK (SOT427) package, using a trench-gate process for the power FET chip 6 or 5 respectively and a CMOS process for the chip comprising the items 20–24, 27, 28, 34 and 35.

If the switch 6 of FIG. 3 is constructed as a power FET, for example an n-channel power FET with its source connected to the terminal 41 and its drain connected to the terminal 40, the coupling 12 together with the FET 6 and the connections from the upper electrode of FET 6 to the disable signal input 13 and from the lower electrode of FET 6 to the input 29 of comparator 28 effectively form a self-adjusting power FET or switch device. Such a device may itself be formed as a unitary device if desired, with terminals 36, 39, 40, 41 and 47. Again the terminals 39 and 40 on such a device may be combined as a single terminal if desired.

From reading the above description and studying the accompanying drawings, other modifications and variations will be apparent to persons skilled in the art. Such modifications and variations may involve other features which are already known in the art and which may be used instead of or in addition to features already disclosed herein. Although claims have been formulated in this application to particular combinations of features, it should be understood that the scope of the disclosure of the present application includes any and every novel feature or combination of features disclosed herein either explicitly or implicitly and together with all such modifications and variations, whether or not relating to the main inventive concepts disclosed herein and whether or not it mitigates any or all of the same technical problems as the main inventive concepts. The applicants hereby give notice that patent claims may be formulated to such features and/or combinations of such features during prosecution of the present application or of any further application derived or claiming priority therefrom.

What is claimed is:

1. A switching arrangement for a dc—dc converter, for connecting one end of an inductor, which is included in the converter and the other end of which is connected to a dc output, alternately to a dc input for receiving a dc input voltage of a given polarity and to a common point, said arrangement having a switching signal input and a switch output for connection to the one end of the inductor, said arrangement comprising first and second controllable semiconductor switches connected in series between the dc input and the common point with the first switch connected to the dc input and the second switch connected to the common point, and first and second couplings from the switching signal input to control inputs of the first and second switches respectively for controlling the switches to operate in antiphase in response to the application of a switching signal to the switching signal input, the second coupling being provided with a threshold-responsive disable signal input for disabling control of the second switch to its closed state when the voltage on the disable signal input has said given polarity relative to a predetermined threshold value, the connection between the first and second switches being connected to the switch output and the disable signal input, characterized in that said predetermined threshold value is substantially equal to the voltage at said common point.

2. An arrangement as claimed in claim 1, wherein the disable signal input is constituted by a first input of a voltage comparator which has a second input connected to the common point and an output coupled to the control input of the second switch.

3. An arrangement as claimed in claim 1, wherein the first coupling is also provided with a threshold-responsive disable signal input for disabling control of the first switch to its closed state when the voltage on this disable signal input has said given polarity relative to a predetermined threshold value, this disable signal input being connected to the control electrode of the second switch.

4. An arrangement as claimed in claim 3, wherein the disable signal input of the first coupling is constituted by a first input of a voltage comparator which has a second input connected to the output of a reference voltage source and an output coupled to the control input of the first switch.

5. An arrangement as claimed in claim 1, wherein the semiconductor switches are field effect transistors of the same conductivity type.

6. A dc—dc converter including a switching arrangement as claimed in claim 1, the converter also including the inductor connected between the switch output and the dc output, a capacitor connected between the dc output and the common point, and a switching signal source having its output connected to the switching signal input.

7. A coupling and switch device for use in a switching arrangement as claimed in claim 1, said device having a switching signal input terminal, a control signal output terminal for connection to the control input of the first switch, a further output terminal for connection to the main current path of the first switch and to said switch output, a sense signal input terminal for connection to the further output terminal, a voltage supply terminal, and a common terminal, said device comprising a controllable semiconductor switch for use as said second semiconductor switch, which controllable semiconductor switch is connected between the further output terminal and the common terminal, and first and second couplings from the switching signal input to the control signal output terminal and to a control input of said controllable semiconductor switch respectively for producing switch control signals at their respective outputs in response to the application of a switching signal to the switching signal input, the second coupling being provided with a threshold-responsive disable signal input for disabling control of said controllable semiconductor switch to its closed state when the voltage on the disable signal input has the given polarity relative to a predetermined threshold value which is substantially equal to the voltage at said common terminal, the sense signal input terminal being connected to the disable signal input.

8. A device as claimed in claim 7, wherein the disable signal input is constituted by a first input of a voltage comparator which has a second input connected to the common terminal and an output coupled to the control input of said controllable semiconductor switch.

9. A device as claimed in claim 8, wherein the second coupling comprises a NOR gate and a driver circuit connected in cascade, the output of the voltage comparator being connected to a first input of the NOR gate and the switching signal input being connected to a second input of the NOR gate.

10. A device as claimed in claim 9, wherein the first coupling is also provided with a threshold-responsive disable signal input for disabling, when the voltage on this disable signal input has said given polarity relative to a predetermined threshold value, production at said control signal output terminal of a control signal which would otherwise be produced thereat in response to a signal at the switching signal input which is such as to control said semiconductor switch to its open state, this disable signal input being connected to the control electrode of said controllable semiconductor switch.

11. A device as claimed in claim 10 wherein the disable signal input of the first coupling is constituted by a first input of a voltage comparator which has a second input connected to the output of a reference voltage source and an output coupled to said control signal output terminal.

12. A device as claimed in claim 10, wherein the first coupling comprises an inverter, a second NOR gate and a second driver circuit connected in cascade, and a second voltage comparator the output of which is connected to a first input of the second NOR gate, the second voltage comparator having first and second inputs which are connected to the disable signal input of the first coupling and to the output of a reference voltage source respectively, the output of the inverter being connected to a second input of the second NOR gate.

13. A coupling and switch device for use in a switching arrangement as claimed in claim 1, said device having a switching signal input terminal, a control signal output terminal for connection to the control input of the second switch, a further output terminal for connection to the main current path of the second switch and to said switch output, a sense signal input terminal for connection to the further output terminal, a voltage supply terminal, a further supply terminal for connection to the dc input, and a common terminal, said device comprising a controllable semiconductor switch for use as said first semiconductor switch, which controllable semiconductor switch is connected between the further supply terminal and the further output terminal, and first and second couplings from the switching signal input to a control input of said controllable semiconductor switch and to the control signal output terminal respectively for producing switch control signals at their respective outputs in response to the application of a switching signal to the switching signal input, the second coupling being provided with a threshold-responsive disable signal input for disabling, when the voltage on the disable signal input has the given polarity relative to a predetermined threshold value, production at said control signal output terminal of a control signal which would otherwise be produced thereat in response to a signal at the switching signal input which is such as to control said semiconductor switch to its open state, the predetermined threshold value being substantially equal to the voltage at said common terminal and the sense signal input terminal being connected to the disable signal input.

14. A device as claimed in claim 13 wherein the disable signal input is constituted by a first input of a voltage comparator which has a second input connected to the common terminal and an output coupled to said control signal output terminal.

15. A device as claimed in claim 7, wherein said controllable semiconductor switch is a field effect transistor.

16. A modification of a device as claimed in claim 7, wherein the further output terminal and the sense signal input terminal are combined.

17. A switch device for an arrangement as claimed in claim 1, said device having a switching signal input and comprising an n-channel field effect transistor, a coupling from the switching signal input to the gate electrode of said transistor for controlling said transistor alternately to its conductive and non-conductive states in response to the application of a switching signal to said switching signal input, and a voltage comparator having a first input for connection to the drain electrode of said transistor, a second input connected to the source electrode of said transistor, and an output coupled to the gate electrode of said transistor, for disabling control of said transistor to its conductive state in the presence of any positive voltage at the drain electrode of said transistor relative to the source electrode of said transistor.

* * * * *